Nov. 29, 1966 E. J. H. FIALA 3,288,526
SEAT CONSTRUCTION
Filed Sept. 2, 1964
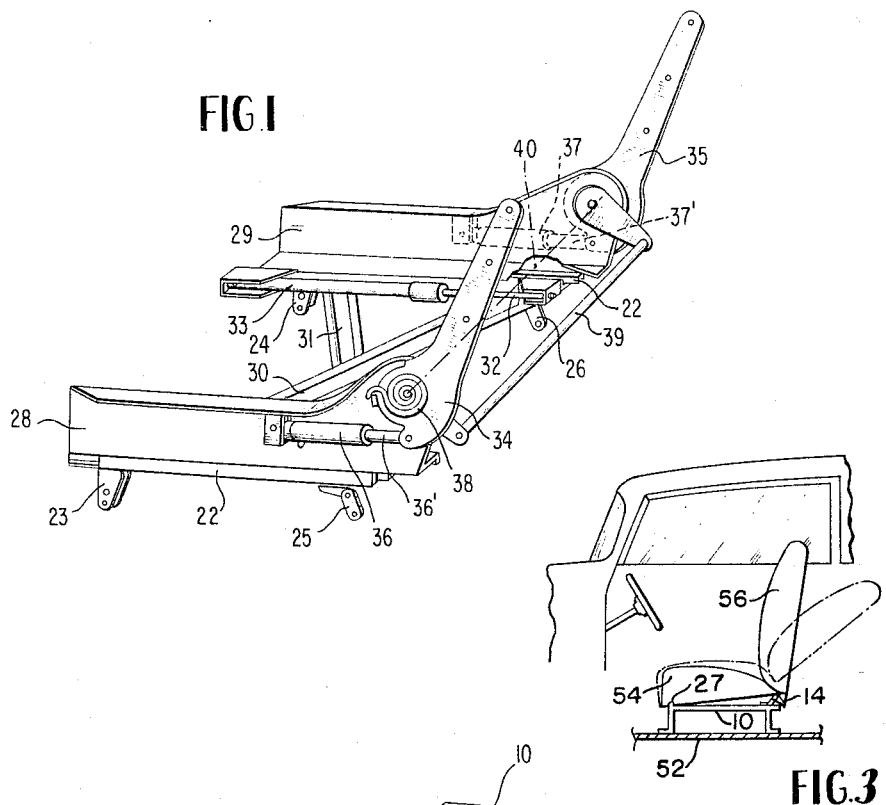
FIG.1
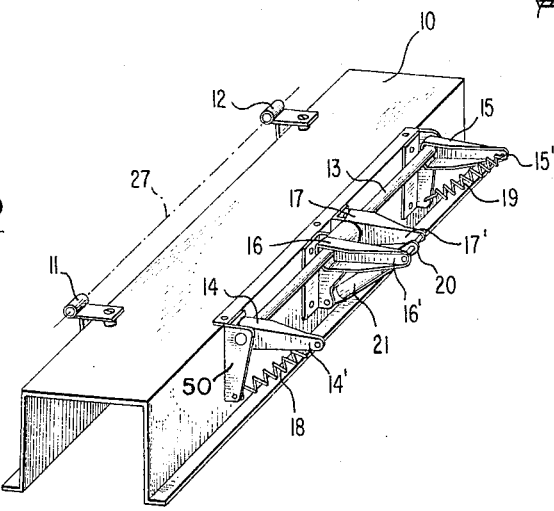
FIG.3
FIG.2
INVENTOR
ERNST J. H. FIALA
BY Dicke & Craig
ATTORNEYS

United States Patent Office 3,288,526
Patented Nov. 29, 1966

3,288,526
SEAT CONSTRUCTION
Ernst J. H. Fiala, Berlin, Germany, assignor to Daimler-Benz Aktiengesellschaft, Stuttgart-Unterturkheim, Germany
Filed Sept. 2, 1964, Ser. No. 393,961
Claims priority, application Germany, Sept. 6, 1963, D 42,414
9 Claims. (Cl. 297—354)

The present invention relates to a seat movable by a servo-force or auxiliary force for vehicles, especially for motor vehicles, which is displaceable in the longitudinal direction, is adapted to be pivoted together with its guide rails about a fixed or stationary vehicle axis and whose back rest is pivotable relative to the seat surface thereof.

The present invention essentially consists in that brackets or outriggers are pivotally connected to the ends opposite the fixed vehicle axis of the rigidly interconnected guide rails, for example, interconnected by means of diagonal struts for the two lateral frame parts of a seat frame made independently of the seat cushion. The brackets or outriggers are rigidly connected together by means of further brackets or outriggers with a pivot shaft arranged at a fixed floor part rigid with the rest of the vehicle. The means effecting the pivot movement of the entire seat, including the seat and brackrest frames, about the fixed axis engage with the free ends of the brackets or outriggers. Means are connected between the guide rails and the lateral seat frame parts for displacing the seat frame, together with the seat cushion and the back rest, in the longitudinal direction. The means for pivoting the back rest frame relative to the seat frame are arranged at the ends of the two lateral seat frame parts of the seat frame opposite the fixed vehicle axis. In accordance with the present invention the means engaging the free ends of the brackets or outriggers secured near the center of the pivot shaft may consist of an adjusting motor operable or effective in only one pivot direction. The means engaging the free ends of the brackets or outriggers secured near the ends of the pivot shaft may consist of springs effective only in the other pivot direction. These means engage with those brackets or outriggers that also establish the pivotal connection with the two guide rails to return or pull back the seat to the lowermost position thereof.

By the construction of the vehicle seat in accordance with the present invention the seat cushion and the back rest cushion may be installed and secured only after installation and assembly of the entire seat frame and adjusting motors, mechanically connected therewith and hydraulically connected with the hydraulic system of the vehicle, so that a soiling of the seat and/or back rest cushions during installation and assembly of the adjusting motors is avoided. Furthermore, the adjusting motors together with the hose connections thereof are readily accessible.

To avoid a canting or tilting of the backrest during the pivot movement thereof relative to the seat, the fittings or frame mounts arranged on both sides of the back rest and pivotally supported at the two lateral frame parts of the seat frame, which engage the means for pivoting the back rest relative to the seat, are rigidly interconnected with each other by a torsion-resistant pipe or tubular member. In accordance with the present invention, the means pivoting the back rest in the one direction may consist of adjusting motors and the means pivoting the back rest in the other direction may consist of spiral springs which, either together with the weight of the backrest or alone, move the same in the other direction. The seat cushion frame, which is to be rigidly connected with the two lateral seat frame parts, serves for purposes of reinforcement of the seat in addition to the reinforcement provided by the diagonal struts connecting the aforesaid lateral seat frame parts.

Accordingly, it is an object of the present invention to provide a displaceable seat for vehicles, especially motor vehicles, which is simple in construction, permits independent pivot movements of the backrest relative to the seat without danger of mutual interference, and is extremely safe and reliable in operation.

It is another object of the present invention to provide a movable seat for motor vehicles which eliminates the danger of soiling of the seat backrest cushions during installation and assembly of the seat frame and/or adjusting motors forming part of the hydraulic servo-system.

Another object of the present invention resides in the provision of a seat assembly for motor vehicles adapted to be displaced and pivoted in various directions in which the servo-motors together with the hose connections thereof are readily accessible.

Still a further object of the present invention resides in the provision of a seat frame assembly achieving the aforementioned objects and advantages by a construction that is simple yet relatively sturdy without the need for numerous separate reinforcing members.

These and other objects, features, and advantages of the present invention will become more obvious from the following description when taken in connection with the accompanying drawing which shows, for purposes of illustration only, one embodiment in accordance with the present invention, and wherein FIGURE 1 is a perspective view of the seat frame together with the fittings or support mounts of the back rest, and;

FIGURE 2 is a perspective view of the floor bearer part for the seat frame of FIGURE 1.

FIGURE 3 illustrates an installation of the movable vehicle seat.

The two parts of a movable vehicle seat according to the present invention, illustrated in FIGURES 1 and 2, are arranged one above the other and are shown in perspective. The seat cushion and the back rest cushion have been omitted appropriately for sake of clarity.

In FIGURE 2, reference numeral 10 designates a cross bearer forming part of a conventional floor frame of a motor vehicle to which are rigidly secured along the upper forward edge the relatively fixed hinge parts 11 and 12. A pivot shaft 13 is pivotably supported at the rearward part of the cross bearer 10 by any suitable means such as brackets and/or angle irons generally designated by reference numeral 50 and indicated in FIGURE 2. Four brackets or outriggers 14, 15, 16, and 17 are secured at the shaft 13 for rotation in unison therewith. One tension spring 18 and 19 each engages the free ends 14' and 15', respectively, while the other end of each spring 18 and 19 is suitably secured at the cross bearer 10 or at the bracket structure 50. The centrally disposed brackets or outriggers 16 and 17 are connected with each other at the free ends 16' and 17' thereof by a rod 20 to which is pivotally secured the piston rod of a unilaterally operable adjusting motor 21.

In FIGURE 1, reference numerals 22 designate two lateral guide rails of suitable cross section which are each provided in the forward portions thereof with an immovable or fixed double-shackle 23 and 24, respectively, and in the rear portions thereof with a movable shackle 25 and 26, respectively. The fixed shackles 23 and 24 are connected with the fixed hinge parts 11 and 12, rigid with the vehicle, by means of a bolt each (not shown) whose axes form the fixed pivot axis 27 (FIGURE 2). The movable or pivot shackles 25 and 26 are pivotally connected with the free ends 14' and 15' of the brackets 14 and 15, respectively.

The two lateral seat frame parts 28 and 29 of the seat frame of complementary cross section are guided in the two lateral guide rails 22 which are reinforced by diagonal struts 30 and 31. One end of a piston rod 32 of an adjusting motor 33 rigidly connected with the frame part 29 is secured to one of the guide rails 22 to produce relative longitudinal displacement therebetween.

Fittings or mounts 34 and 35 for the back rest cushion (not shown) are supported pivotably by conventional means in the rear sections of the lateral frame parts 28 and 29. The piston rod 36' and 37' of adjusting motors 36 and 37 are pivotally connected with the fittings or mounts 34 and 35; additionally, spiral springs 38 are arranged at the fittings or mounts 34 and 35. The fittings or mounts 34 and 35 are rigidly connected with each other by a torsion-resistant tubular member 39.

The adjusting motor 21 and the springs 18 and 19 serve for the pivot movement of the entire vehicle seat about the fixed vehicle axis 27. The adjusting motors 36 and 37 and the spiral springs 38 serve for the pivot movement of the back rest about the axis 40. The adjusting motor 33 serves for the longitudinal displacement of the vehicle seat on the guide rails 22. After assembly and installation of the seat frame on the cross bearer 10 which is mounted on floor 52 of the vehicle the seat cushion 54 and back rest cushion 56 (FIG. 3) are installed. The actuation of the adjusting motors takes place by a means of conventional actuating switch (not shown) whereby different movements may be realized either alone or in unison.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

What is claimed is:

1. A vehicle seat especially for motor vehicles having floor means, which is displaceable in the longitudinal direction and is adapted to be moved by an auxiliary force, comprising:
   a seat frame structure including seat frame means and back rest frame means,
   said seat frame means including guide rail means and lateral frame parts guided in said guide rail means,
   first adjusting means operatively connected with said frame structure for displacing said frame structure including the seat frame means in the longitudinal direction,
   second adjusting means for driving said seat frame structure including said seat frame means and said back rest frame means to a selective position of rest in one of a plurality of positions about a transverse vehicle axis through said seat frame means intermediate a first position wherein said seat frame means is horizontal and a second position wherein said seat frame means is tilted several degrees from the horizontal,
   and third adjusting means operatively connected with said lateral frame parts for pivoting said back rest frame means relative to said seat frame means.

2. A vehicle seat especially for motor vehicles having floor means, which is displaceable in the longitudinal direction, and is adapted to be moved by an auxiliary force, comprising:
   a seat frame structure including seat frame means and back rest frame means,
   said seat frame means including guide rail means and lateral frame parts guided in said guide rail means,
   first adjusting means operatively connected with said frame structure for displacing said frame structure including the seat frame means in the longitudinal direction,
   second adjusting means for pivoting said seat frame structure including said seat frame means and said back rest frame means about a fixed vehicle axis,
   and third adjusting means operatively connected with said lateral frame parts for pivoting said back rest frame means relative to said seat frame means,
   said second adjusting means including outrigger means pivotally supported at said floor means, first means operatively engaging the free ends of some of said outrigger means for producing the pivot movement of said seat frame structure in one direction about said fixed vehicle axis and second means operatively engaging the free ends of the other outrigger means for producing the pivot movement of said seat frame structure about said fixed vehicle axis in the other direction.

3. A vehicle seat especially for motor vehicles having floor means, which is displaceable in the longitudinal direction and is adapted to be moved by an auxiliary force, comprising:
   a seat frame structure including seat frame means and back rest frame means,
   said seat frame means including guide rail means and lateral frame parts guided in said guide rail means,
   first adjusting means operatively connected with said frame structure for displacing said frame structure including the seat frame means in the longitudinal direction,
   second adjusting means for pivoting said seat frame structure including said seat frame means and said back rest frame means about a fixed vehicle axis,
   and third adjusting means operatively connected with said lateral frame parts for pivoting said back rest frame means relative to said seat frame means,
   said second adjusting means including outrigger means secured to a transverse shaft which is pivotally supported at said floor means, first means operatively engaging the free ends of some of said outrigger means for producing a pivot movement of said seat frame structure about said fixed vehicle axis in one direction and second means operatively engaging the free ends of the other outrigger means for producing the pivot movement of said seat frame structure about said fixed vehicle axis in the other direction,
   said first means being constituted by adjusting motor means and said second means being constituted by spring means, said spring means engaging with those outrigger means which establish a pivotal connection with said guide rail means, and said spring means normally seeking to return the seat into the lowest position thereof.

4. A vehicle seat especially for motor vehicles having floor means, which is displaceable in the longitudinal direction and is adapted to be moved by an auxiliary force, comprising:
   a seat frame structure including seat frame means and back rest frame means,
   said seat frame means including guide rail means and lateral frame parts guided in said guide rail means,
   first adjusting means operatively connected with said frame structure for displacing said frame structure including the seat frame means in the longitudinal direction,
   second adjusting means for pivoting said seat frame structure including said seat frame means and said back rest frame means about a fixed vehicle axis,
   and third adjusting means operatively connected with said lateral frame parts for pivoting said back rest frame means relative to said seat frame means,
   said back rest frame means including two back rest mounts arranged on both sides of the back rest and pivotally secured at the said aforementioned lateral frame parts and a torsion-resistant member rigidly interconnecting the back rest mounts and said third adjusting means engaging with said back rest mounts, said third adjusting means including adjusting motor means adjusting said back rest frame means in one direction and spiral spring means adjusting said back rest frame means in the other direction.

5. A vehicle seat especially for motor vehicles having floor means, which is displaceable in the longitudinal direction and is adapted to be moved by an auxiliary force, comprising:

a seat frame structure including seat frame means and back rest frame means, said seat frame means being made independently of the seat cushion and including guide rail means and lateral frame parts guided in said guide rail means, and diagonal strut means reinforcing said guide rail means, first adjusting means operatively connected with said frame structure for displacing said frame structure including the seat frame means and the back rest frame means in the longitudinal direction relative to said guide rail means, second adjusting means for pivoting said seat frame structure including said seat frame means and said back rest frame means about a fixed vehicle axis, and third adjusting means operatively connected with said lateral frame parts near the ends thereof opposite said fixed axis, said third adjusting means including adjusting motor means for moving said backrest frame means in one direction about said fixed vehicle axis and spiral spring means for moving said backrest frame means in the other direction about said fixed vehicle axis.

6. A vehicle seat especially for motor vehicles having floor means, which is displaceable in the longitudinal direction, and is adapted to be moved by an auxiliary force, comprising:

a seat frame structure including seat frame means and back rest frame means, said seat frame means including guide rail means and lateral frame parts guided in said guide rail means, first adjusting means operatively connected with said frame structure for displacing said frame structure including the seat frame means in the longitudinal direction, second adjusting means for pivoting said seat frame structure including said seat frame means and said back rest frame means about a fixed vehicle axis, and third adjusting means operatively connected with said lateral frame parts for pivoting said back rest frame means relative to said seat frame means, said second adjusting means including outrigger means secured to a transverse shaft which is pivotally supported at said floor means, first means operatively engaging the free ends of some of said outrigger means for producing a pivot movement of said frame structure about said fixed vehicle axis in one direction and second means operatively engaging the free ends of the other outrigger means for producing the pivot movement of said seat frame structure about said fixed vehicle axis in the other direction, said first means being constituted by adjusting motor means and said second means being constituted by spring means, said spring means engaging with those outrigger means which establish a pivotal connection with said guide rail means, and said spring means normally seeking to return the seat structure into the lowest position thereof, said back rest frame means including two back rest mounts arranged on both sides of the back rest and pivotally secured at the said first-mentioned lateral frame parts, and a torsion-resistant member rigidly interconnecting the back rest mounts and said third adjusting means engaging with said back rest mounts, said third adjusting means including adjusting motor means adjusting said back rest frame means in one direction and spiral spring means adjusting said back rest frame means in the other direction.

7. A vehicle seat especially for motor vehicles having floor means which is displaceable in the longitudinal direction and is adapted to be moved by an auxiliary force, comprising:

a seal frame structure including seat frame means and back rest frame means, said seat frame means being made independently of the seat cushion and including guide rail means and lateral frame parts guided in said guide rail means, and diagonal strut means reinforcing said guide rail means, first adjusting means operatively connected with said frame structure for displacing the seat frame means and the back rest frame means in the longitudinal direction relative to said guide rail means, second adjusting means for pivoting said seat frame structure including said seat frame means and said back rest frame means about a fixed vehicle axis in one direction, and third adjusting means operatively connected with said lateral frame parts near the ends thereof opposite said fixed axis relative to said seat frame means, said second adjusting means including outrigger means secured to a transverse shaft which is pivotally supported at said floor means, first means operatively engaging the free ends of some of said outrigger means for producing the pivot movement of said seat frame structure about said fixed vehicle axis in the other direction, and means pivotally connecting the forward end of said seat frame structure with said floor means so as to be pivotal about said fixed vehicle axis, said first means being constituted by adjusting motor means and second means being constituted by spring means, said spring means engaging with those outrigger means which establish a pivotal connection with said guide rail means, and said spring means normally seeking to return the seat structure into the lowest position thereof.

8. A vehicle seat especially for motor vehicles having floor means, which is displaceable in the longitudinal direction and is adapted to be moved by an auxiliary force, comprising:

a seat frame structure including seat frame means and back rest frame means, said seat frame means being made independently of the seat cushion and including guide rail means and lateral frame parts guided in said guide rail means, and diagonal strut means reinforcing said guide rail means, first adjusting means operatively connected with said frame structure for displacing said frame structure including seat frame means and the back rest frame means in the longitudinal direction relative to said guide rail means, second adjusting means for pivoting said seat frame structure including said seat frame means and said back rest frame means about a fixed vehicle axis, and third adjusting means operatively connected with said lateral frame parts near the ends thereof opposite said fixed axis for pivoting said back rest frame means relative to said seat frame means, said second adjusting means including outrigger means secured to a transverse shaft which is pivotally supported at said floor means, first means operatively engaging the free ends of some of said outrigger means for producing a pivot movement of said seat frame structure about said fixed vehicle axis in one direction and second means operatively engaging the free ends of the other outrigger means for producing the pivot movement of said seat frame structure about said fixed vehicle axis in the other direction, and means pivotally connecting the forward end of said seat frame structure with said floor means so as to be pivotal about said fixed vehicle axis, said first means being constituted by adjusting motor means and said second means being constituted by spring means said spring means engaging with those outrigger means which establish a pivotal connection with said guide rail means, and said spring means normally seeking to return the seat structure into the lowest position thereof, said back rest frame means including two back rest mounts arranged on both sides of the back rest and pivotally secured at the said first-mentioned lateral frame parts, and a torsion-resistant member rigidly interconnecting the back rest mounts, and said third adjusting means engaging with said back rest mounts, said third adjusting means including adjusting motor means adjusting said back rest frame means in one direction and spiral spring means adjusting said back rest frame means in the other direction.

9. A vehicle seat especially for motor vehicles having floor bearer means which is displaceable in the longitudinal direction, and is adapted to be moved by an auxiliary force, comprising:

a frame structure including seat frame means and back rest frame means, said seat frame means being made independently of the seat cushion and including guide rail means and lateral seat frame parts guided in said guide rail means for relative longitudinal displacement, and diagonal strut means reinforcing said guide rail means, first adjusting means operatively connected with said frame structure for displacing said frame structure inclusive the seat frame means and the back rest frame means in the longitudinal direction relative to said guide rail means, second adjusting means for pivoting said seat frame structure inclusive said seat frame means and said back rest frame means about a fixed vehicle axis, and third adjusting means for pivoting said back rest frame means relative to said seat frame means, said third adjusting means including adjusting motor means for moving said back rest frame means in one direction about said fixed vehicle axis and spiral spring means for moving said back rest frame means in the other direction about said fixed vehicle axis, said second adjusting means including outrigger means pivotally supported on said floor means, said seat frame means including a separate cushion frame for reinforcing said seat frame means when said cushion frame is connected to said lateral seat frame parts.

References Cited by the Examiner

UNITED STATES PATENTS

| | | | |
|---|---|---|---|
| 2,277,357 | 3/1942 | Saunders | 248—229 |
| 2,660,223 | 11/1953 | Appleton | 297—344 X |
| 2,915,112 | 12/1959 | Schwartz | 297—361 X |
| 2,971,566 | 2/1961 | Negroni | 297—344 X |
| 2,974,998 | 3/1961 | Himka | 297—344 X |
| 3,051,526 | 8/1962 | Werner et al. | 297—367 |

FRANK B. SHERRY, *Primary Examiner.*

CASMIR A. NUNBERG, *Examiner.*

R. B. FARLEY, G. O. FINCH, *Assistant Examiners.*